Patented Feb. 9, 1954

2,668,815

UNITED STATES PATENT OFFICE 2,668,815

VAT DYESTUFFS OF THE PERYLENE-TETRACARBOXYLIC ACID BIS-ARYL-IMIDE SERIES

Paul Nawiasky, Summit, N. J., assignor to General Aniline & Film Corporation, New York, N. Y., a corporation of Delaware No Drawing. Application May 24, 1951,
Serial No. 228,117

6 Claims. (Cl. 260—272)

This invention relates to novel vat dyestuffs of the 3,4,9,10-perylene-tetracarboxylic acid bis-arylimide series.

Arylimides of 3,4,9,10-perylene-tetracarboxylic acid are known to be valuable dyestuffs, yielding in general, scarlet shades on cellulosic textile material when applied by the usual vat dyeing procedure from a hydrosulfite vat with subsequent oxidation on the fiber. Such dyestuffs are disclosed, for example, in German Patent 386,057, in which it is indicated that the arylimide radical can be derived from o-, m- or p-phenylenediamine or may contain other simple substituents. As indicated in Swiss Patent 101,762, the bis-o-amino-phenylimide of 3,4,9,10-perylene-tetracarboxylic acid yields violet shades on cotton when dyed from a hydrosulfite vat.

I have discovered that 3,4,9,10-perylene-tetracarboxylic acid bis-arylimides in which the aryl radicals joined to the imide nitrogen are acyl-amino-phenyl radicals, the acyl group being that of a carboxylic acid, produce colorations on cellulosic materials by the aforesaid usual vat dyeing procedure, of superior brilliance of shade and fastness to light and chlorine, and possess outstanding dye strength. Especially strong and valuable shades are obtained with the dyestuffs of my invention in which the acyl groups are those of anthraquinone carboxylic acids. The colorations are red and have a somewhat more bluish shade than that obtained with the corresponding arylimides containing no acylamino group.

The novel dyestuffs of this invention can be prepared by condensing 3,4,9,10-perylene-tetracarboxylic acid with the corresponding acyl-amido-phenylamines, e. g. by the procedure described in U. S. Patent 2,543,747, or by acylation of bis-amino-phenylimides of 3,4,9,10-perylene-tetracarboxylic acid with acid chlorides, bromides or anhydrides of the selected carboxylic acid, advantageously in the presence of a condensing agent such as phosphorus pentachloride. When the carboxylic acid to which the acyl group corresponds contains a nitro group, the latter can be subsequently reduced to an amino group in the finished dyestuff.

The resulting dyestuffs according to this invention can be represented by the following general formula:

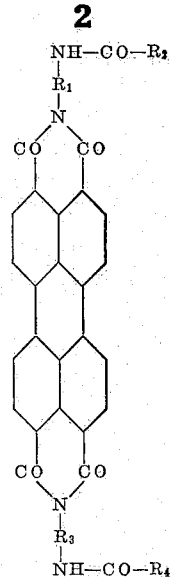

wherein $R_1$ and $R_3$ are monocyclic aryl groups, preferably phenylene radicals, and especially p-phenylene radicals, which can be further substituted, for example, by alkyl groups (e. g. methyl, ethyl, isopropyl and butyl groups) or halogen (e. g. chlorine, bromine); and $R_2CO$ and $R_4CO$ are similar or different acyl radicals of organic carboxylic acids, preferably monocyclic acids. The radicals $R_2$ and $R_4$ thus represent organic radicals which can be aliphatic, aromatic, araliphatic, alicyclic or heterocyclic, and can be further substituted, if desired, for example, by alkyl (e. g. methyl, ethyl, isopropyl, butyl), alkoxy (e. g. methoxy, ethoxy, 2-hydroxyethoxy), halogen (e. g. chlorine, bromine), nitro or amino groups. Especially valuable dyestuffs are obtained when $R_2$ and $R_4$ are anthraquinone radicals.

Preparation of dyestuffs in accordance with my invention is illustrated by the following examples, wherein parts and percentages are by weight.

Example 1

A mixture of 3 parts of 3,4,9,10-perylene-tetracarboxylic acid anhydride with 3 parts of N-acetyl-p-phenylene-diamine is heated in 30 parts of phenol as a reaction medium, to boiling temperature under reflux (about 180° C.) until condensation is substantially complete. The reaction mixture is then cooled to 80° C., diluted with 100 parts of methanol, and the insoluble dyestuff recovered from the mixture by filtration. The filter cake is washed successively with methanol and water, and unreacted perylene tetracarboxylic acid is removed by slurrying the press cake with aqueous 2% caustic soda solution at boiling temperature until no further acid dissolves. The resulting slurry is filtered, and the press cake washed with hot water and dried. The resulting dyestuff, which is the bis-p-acetamido-phenylimide of 3,4,9,10-perylene-tetracarboxylic acid dissolves in 96% sulfuric acid with red coloration showing strong red fluorescence, and forms an aqueous alkaline hydrosulfite vat having a red-violet color and yielding bright bluish-scarlet shades of exceptional fastness to washing and light on cotton dyed therewith and subsequently oxidized to regenerate the vat dyestuff on the fiber.

*Example 2*

19.6 parts of 3,4,9,10-perylene-tetracarboxylic acid anhydride are heated with a solution of 20 parts of 90% caustic potash in 350 parts of water to 90° C. The resulting solution is cooled to 50° C. and added to a solution of 20.3 parts of p-phenylene-diamine in a mixture of 25 parts of glacial acetic acid and 100 parts of water. The resulting slurry is heated in an autoclave at 140 to 145° C. for 5 hours, cooled to room temperature (20 to 30° C.), filtered, and the filter cake washed with water until neutral. The press cake is then boiled with an aqueous 2% caustic soda solution, again recovered by filtration, washed neutral, and dried. The product, which is the bis-p-amino-phenylimide of 3,4,9,10-perylene-tetracarboxylic acid is a dark brown-red powder dissolving in 96% sulfuric acid with red coloration showing strong red fluorescence, and dyeing cotton from a warm red-violet alkaline hydrosulfite vat in brownish-red shades which become brighter on treatment with dilute aqueous alkali metal hypochlorite.

3 parts of the compound thus obtained are acylated by reaction with 4 parts of benzoyl chloride in 60 parts of nitrobenzene by heating at 145 to 150° C. for several hours. The reaction mixture is cooled to room temperature, filtered, and the press cake washed successively with nitrobenzene and benzene and dried. The dyestuff thus obtained is the bis-p-benzamido-phenylimide of 3,4,9,10-perylene-tetracarboxylic acid. The product is a brown-red powder dissolving in concentrated sulfuric acid with strong red fluorescence. For dyeing purposes, it is first acid pasted by dissolving in concentrated sulfuric acid and reprecipitated by drowning in cold water, the dyestuff being recovered from the resulting slurry by filtration and washing with water until neutral. With aqueous alkaline hydrosulfites, it forms a red-violet vat yielding a bright red shade on cotton with excellent fastness to light and chlorine.

Benzoyl chloride can be replaced in this example by an equivalent amount of p-anisoyl chloride, whereby the bis-p-anisoyl-amino-phenylimide of 3,4,9,10-perylene tetracarboxylic acid is obtained in the form of a deep brown-red powder yielding somewhat bluer-red shades on cotton than the corresponding benzoylated derivative when dyed from an alkaline hydrosulfite vat.

*Example 3*

2.9 parts of the bis-p-amino-phenylimide of 3,4,9,10-perylene-tetracarboxylic acid, obtained as described in the preceding example, are heated with 2.8 parts of the acid chloride of anthraquinone-2-carboxylic acid in 50 parts of nitrobenzene for 10 hours at 160 to 170° C. Further processing is carried out in the same manner as in Example 2. The dyestuff thus obtained is the bis-p-β-anthraquinonoylamino-phenylimide of 3,4,9,10-perylene-tetracarboxylic acid. It is a dark red-brown powder, dissolving in concentrated sulfuric acid with a violet coloration showing strong red fluorescence, and dyeing the cotton in strong deep red shades from a deep red alkaline hydrosulfite vat, the shades produced being much stronger than those of the dyestuffs of the preceding examples.

*Example 4*

5.7 parts of bis-p-amino-phenylimide of 3,4,9,10-perylene-tetracarboxylic acid are heated with 6.4 parts of the acid chloride of 1-nitro-anthraquinone-2-carboxylic acid in 100 parts of nitrobenzene at 145 to 150° C. for about 10 hours, and the temperature then raised to 195 to 200° C. until evolution of hydrochloric acid substantially ceases. Further processing is carried out in the same manner as in Example 2. The resulting dyestuff is a bright red powder dissolving in concentrated sulfuric acid with violet coloration showing red fluorescence, and dyeing cotton from a blue-red alkaline hydrosulfite vat in deep bright red shades of excellent fastness properties, especially to light and chlorine. The dyestuff initially obtained is the bis-p-(1-nitro-2-anthraquinonylamino)-phenylimide of 3,4,9,10-perylene-tetracarboxylic acid. Owing to reduction of the nitro group in an alkaline hydrosulfite vat, the dyestuff produced on cotton fiber in the aforesaid manner is the bis-p-(1-amino-2-anthraquinonylamino)-phenylimide of 3,4,9,10-perylene-tetracarboxylic acid.

The latter product can be obtained in substance by replacing the 6.4 parts of 1-nitro-anthraquinone-2-carboxylic acid chloride in the foregoing procedure with 5.8 parts of the acid chloride of 1-amino-anthraquinone-2-carboxylic acid, the reaction temperature being maintained, in this case, at 145 to 150° C. throughout the acylation. The resulting dyestuff is a deep brown-red powder, dissolving in concentrated sulfuric acid with violet coloration and red fluorescence, and yielding shades on cotton from an alkaline hydrosulfite vat which are identical to those obtained by similar dyeing with the corresponding nitroanthraquinonoyl derivative described in this example.

Instead of the bis-p-amino-phenylamines or acylated derivatives thereof employed as intermediates in the foregoing examples, the corresponding derivatives of m-phenylene-diamines can be used, as well as the nuclear ethyl, methyl, isopropyl, butyl, chloro and bromo-substituted derivatives of the three phenylene-diamines. The acylating agents employed in the procedure in Examples 2 to 4 and the acyl radical of the phenylene-diamine intermediate of Example 1 can be replaced by corresponding derivatives of other carboxylic acids as, for example, formic, propionic, butyric, isobutyric, glycolic, phenylacetic, chloroacetic, phenoxyacetic, toluic, o-chlorobenzoic, salicylic, o-methoxybenzoic, p-nitrobenzoic, anthranilic, p-aminobenzoic, cyclohexanoic, methyl cyclohexanoic, α- and β-furoic, and nicotinic acids; and among the preferred anthraquinone acyl radicals, those corresponding to α-anthraquinone carboxylic acid, and chloroanthraquinone - 2 - carboxylic acid. The dyestuffs resulting from these variations have advantageous properties similar to those of the dyestuffs obtained according to the foregoing examples.

Variations and modifications, which will be obvious to those skilled in the art, can be made in the procedures and compositions described herein without departing from the scope or spirit of the invention.

I claim:

1. A vat dye having the following general formula:

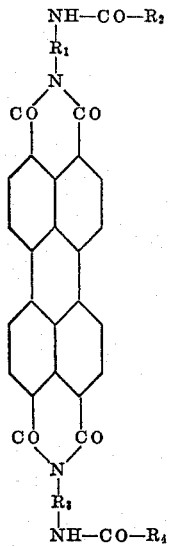

wherein $R_1$ and $R_3$ represent similar phenylene groups in which the nuclear positions other than the two shown joined to nitrogen are occupied by members of the group consisting of hydrogen, alkyl groups of 1 to 4 carbon atoms, chlorine and bromine and wherein $R_2$ and $R_4$ are similar members of the group consisting of hydrogen, alkyl, mononuclear-aryl, -aralkyl, -cycloaliphatic, furyl, pyridyl and anthraquinonyl radicals.

2. The bis-p-acetamidophenylimide of 3,4,9,10-perylene-tetracarboxylic acid.

3. The bis-p-benzamidophenylimide of 3,4,9,10-perylene-tetracarboxylic acid.

4. The bis-p-β-anthraquinonoylaminophenylimide of 3,4,9,10-perylene-tetracarboxylic acid.

5. The bis - p - (1 - nitro - 2 - anthraquinonoyl-amino)-phenylimide of 3,4,9,10-perylene-tetracarboxylic acid.

6. The bis- p - (1 - amino-2-anthraquinonoyl-amino)-phenylimide of 3,4,9,10-perylene-tetracarboxylic acid.

PAUL NAWIASKY.

References Cited in the file of this patent

FOREIGN PATENTS

| Number | Country | Date |
| --- | --- | --- |
| 201,786 | Great Britain | 1923 |
| 386,057 | Germany | 1923 |

OTHER REFERENCES

Beilstein, 4th ed., 1930, vol. 13, p. 45.